Jan. 11, 1966     B. H. PAULSON     3,228,727
VEHICLE BOX HAVING RAISING AND DUMPING MEANS
Filed March 5, 1964     4 Sheets-Sheet 1

INVENTOR.
BRUCE H. PAULSON
BY
Merchant, Merchant & Gould
ATTORNEYS

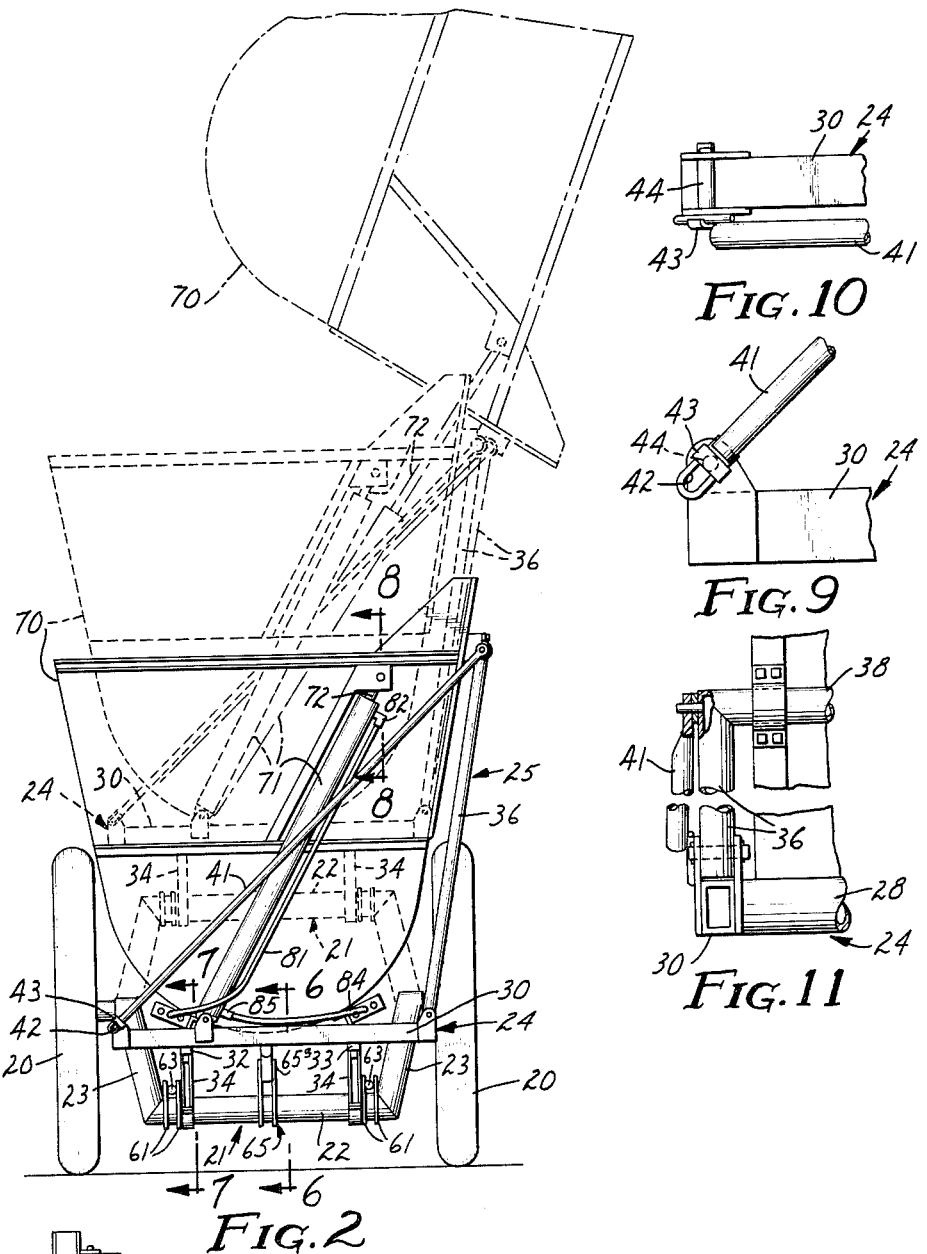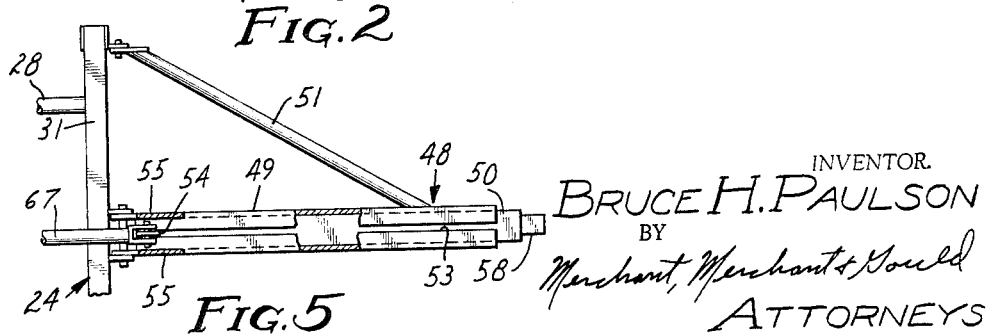

Jan. 11, 1966 B. H. PAULSON 3,228,727
VEHICLE BOX HAVING RAISING AND DUMPING MEANS
Filed March 5, 1964 4 Sheets-Sheet 3
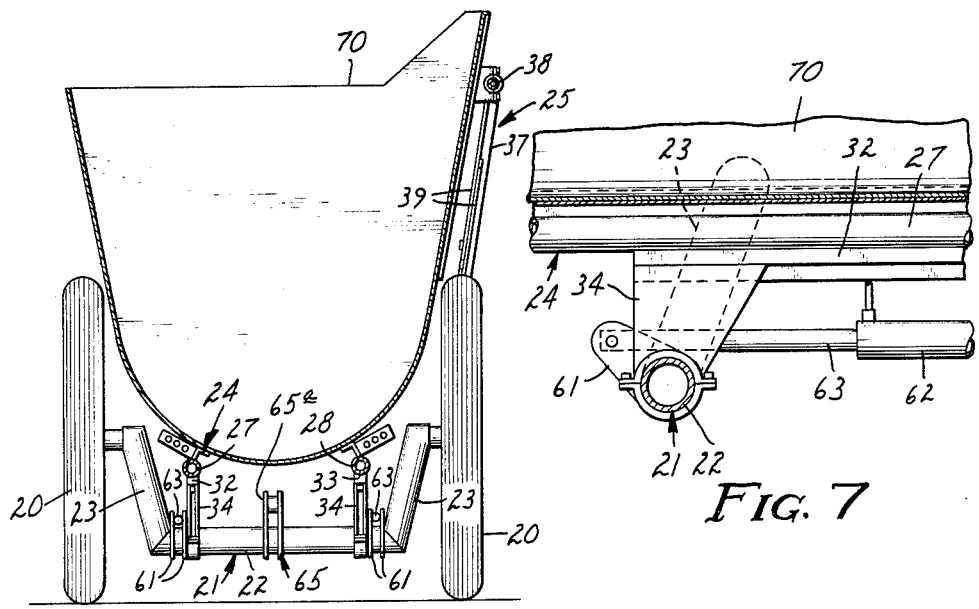
FIG. 3
FIG. 7
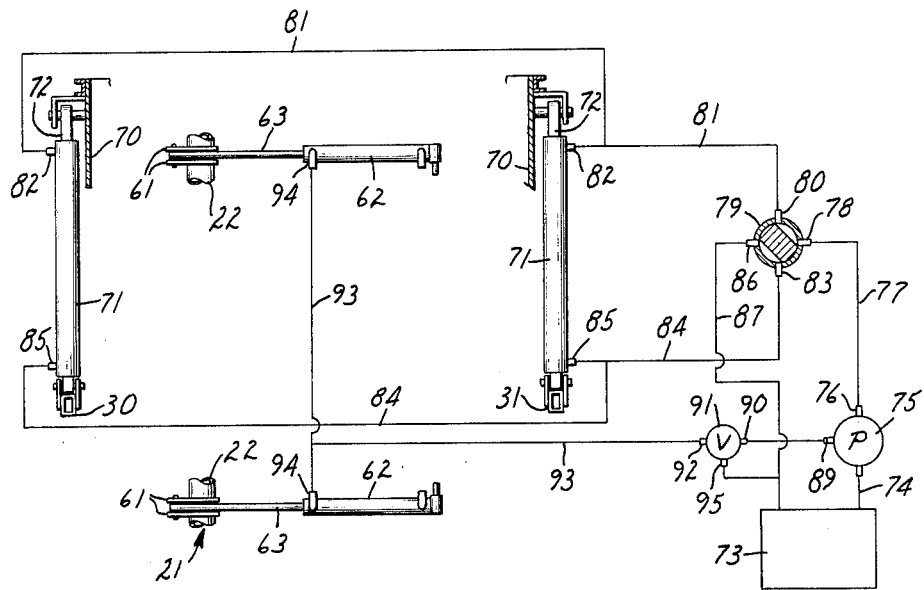
FIG. 12
INVENTOR.
BRUCE H. PAULSON
BY
Merchant, Merchant & Gould
ATTORNEYS INVENTOR.
BRUCE H. PAULSON
BY
Merchant, Merchant & Gould
ATTORNEYS United States Patent Office 3,228,727
Patented Jan. 11, 1966

3,228,727
VEHICLE BOX HAVING RAISING AND
DUMPING MEANS
Bruce H. Paulson, Clayton, Wis., assignor, by mesne assignments, to Pixall Corporation, Clear Lake, Wis., a corporation of Wisconsin
Filed Mar. 5, 1964, Ser. No. 349,659
7 Claims. (Cl. 298—11)

This invention pertains to dump box vehicles and more particularly to the mechanism for raising and dumping the dump box.

The present invention comprises a pair of wheels which are held in spaced apart relationship by a substantially U-shaped axle. A frame member is pivotally secured to the base portion of the U-shaped axle, between the two wheels, and a tongue member extends forwardly from the frame, the axis of the tongue being substantially parallel to the wheels. The tongue member comprises an outer member which is secured to the frame, and a telescoping inner member, the telescoping inner member having a suitable hitching mechanism connected to the extended end thereof.

A box, or similar container, rides on the frame member and has one edge pivotally mounted thereto. A first hydraulic cylinder is connected to the frame member and the piston of the first hydraulic cylinder is connected to the base portion of the U-shaped axle. A first tie rod is connected between the base portion of the U-shaped axle and the outer member of the tongue, while a second tie rod is connected between the base portion of the U-shaped axle and the telescoping inner member of the tongue.

When the first hydraulic cylinder is actuated, the U-shaped axle is inverted thereby moving the frame member to a raised position.

A second hydraulic cylinder is connected between the frame member and the container, and when the second cylinder is actuated, the container is rotated about its pivoted edge thereby dumping the contents from the container.

It is one object of this invention, therefore, to provide an improved dump box vehicle.

Another object of this invention is to provide improved lifting and dumping mechanisms for dump box vehicles.

These and other objects of the invention will become apparent to those skilled in the art upon consideration of the accompanying specification, claims and drawings.

Referring to the drawings, wherein like reference characters indicate like parts or elements throughout the several views:

FIG. 2 is a rear elevation of the present invention, the dump box being shown in raised position by dotted lines and in a dumped position by broken lines;

FIG. 3 is a sectional view taken along a line 3—3 of FIG. 1;

FIG. 5 is a sectional view taken along a line 5—5 of FIG. 1, parts thereof being broken away;

FIG. 7 is a partial sectional view taken along a line 7—7 of FIG. 2;

FIG. 9 is a rear elevation as seen from a line 9—9 of FIG. 4;

FIG. 10 is a top plan view of FIG. 9;

FIG. 11 is a side elevation of a portion of FIG. 1, drawn on an enlarged scale, and showing in greater detail the dump box construction; and FIG. 12 is a schematic representation of hydraulic connections.

Figure 1:
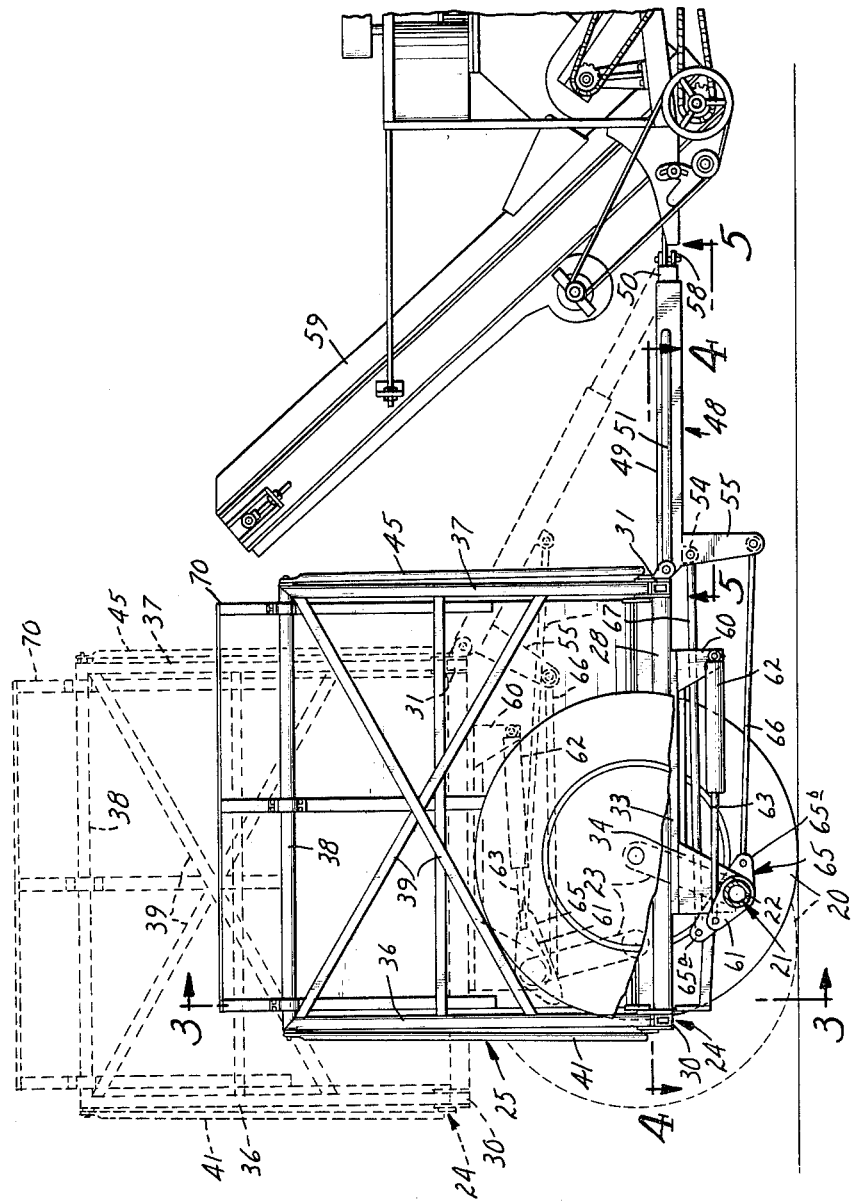
FIG. 1 is a side elevation of a dump box vehicle of the present invention, parts thereof being broken away, the dump box being shown in a raised position by dotted lines.
Figure 4:
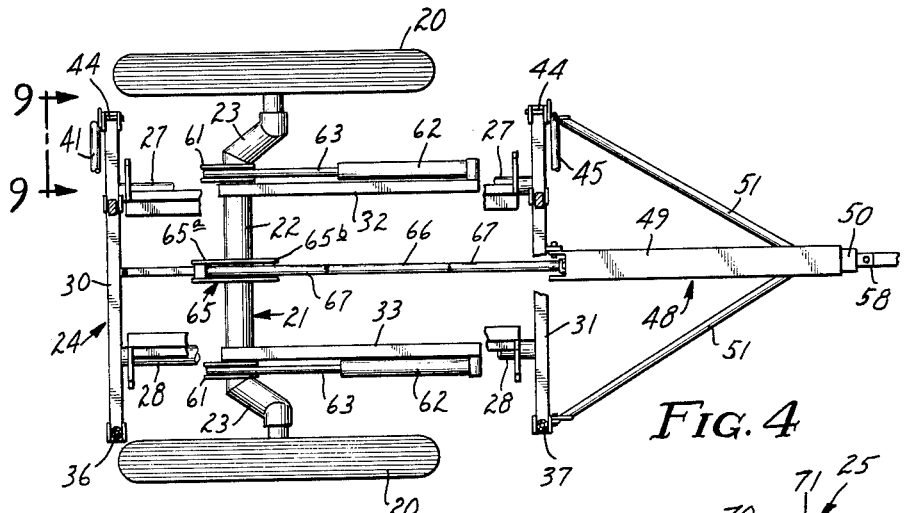
FIG. 4 is a sectional view taken along a line 4—4 of FIG. 1, parts thereof being broken away.
Figure 6:
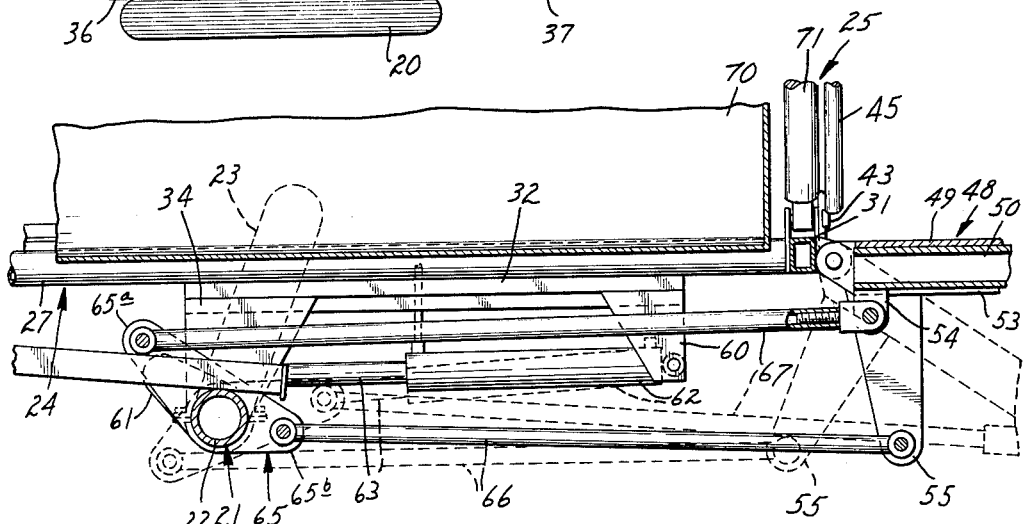
FIG. 6 is a sectional view taken along a line 6—6 of FIG. 2, part of the mechanism being shown in an operating position by means of dotted lines.
Figure 8:
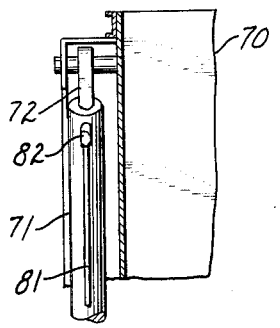
FIG. 8 is a sectional view taken along the line 8—8 of FIG. 2.

Referring with greater particularity to the drawings, there is shown a pair of wheels 20, mounted in spaced apart relationship by means of a substantially U-shaped axle 21 having a base portion 22 and upstanding side portions 23.

A frame member comprises a base portion 24 and an upstanding side portion 25. The frame base portion 24 comprises members 27 and 28 mounted in parallel spaced apart relationship by means of end members 30 and 31 connected to the opposite ends of members 27 and 28. Support rods 32 and 33 are welded to the bottom of members 27 and 28 respectively. Mounting members 34, connected to support members 32 and 33 respectively, extend downwardly and pivotally secure base portion 22 of the U-shaped axle 21.

The upstanding side portion 25 of the frame comprises parallel upstanding side members 36 and 37, side members 36 and 37 being pivotally mounted to adjacent ends of end members 30 and 31 respectively. The extended ends of side members 36 and 37 are connected together by means of a top member 38, while side members 36 and 37 are supported by means of cross support members 39.

A support member 41 has one end thereof pivotally connected to the extended end of upstanding side member 36, the other end of support member 41 having a slot 42 therein. A clamping plate 43 is held in engagement with the other end of support member 41 by means of a bolt 44 extending through the plate 43 and slot 42 of support member 41, bolt 44 being held in engagement with the outer end of end member 30 opposite to the pivot point of side member 36, the movement of bolt 44 in the slot 42 of support member 41 allowing limited rotation of the upstanding side member 36. A second support member 45, substantially identical to support member 41, is connected from the extended end of side member 37 to the end of base member 31 in the same manner as support member 41 is connected.

A tongue member 48 has an outer member 49 and a telescoping inner member 50. One end of outer member 49 of tongue 48 is pivotally connected to base member 31 transversely thereto, the axis of tongue 48 being substantially parallel to the wheels 20. Brace members 51 are connected from outer tongue member 49 to the ends of base member 31. Outer member 49 of tongue 48 has a slot 53 extending longitudinally therein. A mounting barcket 54 is rigidly attached to the telescoping member 50 of tongue 48 and extends downwardly through slot 53. A pair of brackets 55 is rigidly attached to the member 49 of tongue 48 and extends downwardly therefrom. A hitching mechanism 58 is connected to the extended end of telescoping member 50 and is adapted to be connected to a suitable towing mechanism such as a tractor or, as shown in FIG. 1, a harvesting device having a loading conveyor 59.

Mounting brackets 60 are rigidly connected to the forward ends of support members 32 and 33 and extend downwardly therefrom. Ears 61 are rigidly mounted on the base portion 22 of U-shaped axle 21. Hydraulic cylinders 62 are pivotally mounted to the downwardly extending brackets 60, the pistons 63 of cylinders 62 being pivotally connected to the ears 61.

Crank arms 65 are secured to the base portion 22 of U-shaped axle 21. Crank arms 65 consist of ends 65a and 65b and a first tie rod 66 has one end pivotally connected to the end 65b and its other end pivotally connected to the downwardly extending bracket 55 connected to the outer member 49 of tongue 48. A second tie rod 67 has one end pivotally connected to end 65a and its other end pivotally connected to bracket 54 extending through slot 53 and connected to telescoping member 50 of tongue 48.

A box or container 70 rides on the base portion 24 of the frame and is pivotally connected to the upstanding side members 36 and 37 of side portion 25 of the frame. Hydraulic cylinders 71 are pivotally connected to base members 30 and 31, the pistons 72 of hydraulic cylinders 71 being pivotally connected to the container 70.

The hydraulic cylinders 62 and 71 are connected to a suitable supply of hydraulic fluid. Referring particularly to FIG. 12, there is shown a source of hydraulic fluid 73 having a feed line 74 connected to a pump 75. An output 76 of pump 75 is connected by a line 77 to an input 78 of a four-way valve 79. An output 80 of four-way valve 79 is connected by a feed line 81 to inputs 82 of the hydraulic cylinders 71. An output 83 of four-way valve 79 is connected by feed line 84 to input 85 of hydraulic cylinders 71.

An output 86 of four-way valve 79 is connected by a return line 87 to the hydraulic fluid source 73.

An output 89 of pump 75 is connected to an input 90 of a valve 91. An output 92 of valve 91 is connected by a feed line 93 to inputs 94 of the hydraulic cylinders 62. An output 95 of valve 91 is connected by means of a return line to the hydraulic fluid source 73.

In operation, the dump box vehicle is connected by means of hitch 58 to a suitable towing mechanism such as a harvesting device shown in FIG. 1. As the crop is harvested it is carried up conveyor 59 and is deposited in the container 70. When the container is full, the pump 75 is actuated and hydraulic fluid flows through line 74, pump 75, valve 91 and line 93 to the inputs 94 of hydraulic cylinders 62. This hydraulic fluid tends to move the pistons 63 into the cylinders 62. However, since tie rod 66 is connected between crank arm end 65b and bracket 55, the piston 63 cannot immediately move into cylinder 62. Instead, a force is applied to tie rod 67, which is attached between crank arm end 65a and bracket 54, and the inner member 50 of tongue 48 is caused to telescope outward thereby causing the U-shaped axis to rotate clockwise, as shown in FIG. 1, to an inverted position. The inverting of U-shaped axle 21 moves the frame member and hence the container 70 to a raised position.

When the frame and container are in the raised position the operator activates the valve 79 and hydraulic fluid flows from source 73 through pump 75, line 77, input 78 to output 83 of valve 79, and line 84 to the inputs 85 of hydraulic cylinders 71. The hydraulic fluid flowing into the inputs 85 of cylinders 71 force the pistons 72 out of the cylinders and hence move the container 70 to a dumping position, as shown by the broken lines of FIG. 2. When the container has been dumped, the valve 79 is operated so that hydraulic fluid flows through pump 75, line 77, input 78 to output 80 of valve 79, and line 81 to the inputs 82 of hydraulic cylinders 71 thereby forcing the pistons 72 back into the cylinders 71 and returning the container 70 to its original position. When pump 75 is de-energized, the weight of the frame and the weight of the container 70 cause the U-shaped axle 21 to reinvert to its original position thereby returning the frame and container to its lowered position.

While I have shown a specific embodiment of my invention it is to be understood that this is for the purpose of illustration only and that my invention is to be limited solely by the scope of the appended claims.

I claim as my invention:

1. Apparatus of the class described comprising:
   (a) first and second wheel means mounted in spaced apart relationship by means of a substantially U-shaped axle;
   (b) a frame member having a base portion and a side portion, the side portion being pivotally connected to said base portion along one longitudinal edge thereof and extending upwardly to an extended end;
   (c) a support member having one end thereof connected to the extended end of the side portion of said frame, the other end of said support member being slidably connected to the base portion of said frame to allow limited rotation of the side portion of said frame;
   (d) means securing the base portion of said frame member to the base portion of said U-shaped axle;
   (e) a tongue member having an outer member and a telescoping inner member, one end of said tongue member being rigidly secured to the base portion of said frame member, the axis of said tongue being substantially parallel to said wheels;
   (f) a container riding on the base portion of said frame and having one edge pivotally mounted to the extended edge of the side portion of said frame;
   (g) a first hydraulic cylinder pivotally mounted to the base portion of said frame member, the piston of said first hydraulic cylinder being connected to said axle;
   (h) first and second tie rods, said first tie rod connecting said axle to the outer member of said tongue and said second tie rod connecting said axle to the telescoping inner member of said tongue;
   (i) means connected to actuate said first hydraulic cylinder to invert said substantially U-shaped axle and move said frame member to a raised position;
   (j) a second hydraulic cylinder pivotally connected to the base portion of said frame member, the piston of said second hydraulic cylinder being connected to said container; and
   (k) means connected to actuate said second hydraulic cylinder to rotate said container around its pivoted edge to a dumping position.

2. Apparatus of the class described comprising:
   (a) a frame member;
   (b) first and second wheel means mounted in spaced apart relationship by means of a substantially U-shaped axle;
   (c) means securing said frame member to the base portion of said U-shaped axle;
   (d) a tongue member having an outer member and a telescoping inner member, one end of said tongue member being rigidly secured to said frame member, the axis of said tongue being substantially parallel to said wheels;
   (e) a container riding on said frame and having one edge pivotally mounted thereto;
   (f) a first hydraulic cylinder connected to said frame member, the piston of said first hydraulic cylinder being connected to said axle;
   (g) first and second tie rods, said first tie rod connecting said axle to said outer member of the tongue and said second tie rod connecting said axle to the telescoping inner member of said tongue;
   (h) means connected to actuate said first hydraulic cylinder to invert said substantially U-shaped axle and move said frame member to a raised position;
   (i) a second hydraulic cylinder connected to said frame member, the piston of said second hydraulic cylinder being connected to said container; and
   (j) means connected to actuate said second hydraulic cylinder to rotate said container around its pivoted edge to a dumping position.

3. Apparatus of the class described comprising:
   (a) first and second wheel means mounted in spaced apart relationship by means of a substantially U-shaped axle;

(b) a frame member secured to the base portion of said U-shaped axle;
(c) a container riding on said frame and having one edge pivotally mounted thereto;
(d) means connected to invert said U-shaped axle and move said frame to a raised position; and
(e) means connected to said container to rotate said container around its pivotal edge to a dumping position.

4. Apparatus of the class described comprising:
(a) first and second wheel means mounted in spaced apart relationship by means of a substantially U-shaped axle;
(b) a frame member having a base portion and an upwardly extending side portion;
(c) means securing the base portion of said frame member to the base portion of said U-shaped axle;
(d) a tongue member having an outer member and a telescoping inner member, one end of said tongue member being rigidly secured to the base portion of said frame member, the axis of said tongue being substantially parallel to said wheels;
(e) a container riding on the base portion of said frame and having one edge pivotally mounted to the extended edge of the side portion of said frame;
(f) a first hydraulic cylinder pivotally mounted to the base portion of said frame member, the piston of said first hydraulic cylinder being connected to said axle;
(g) first and second tie rods, said first tie rod connecting said axle to the outer member of said tongue and said second tie rod connecting said axle to the telescoping inner member of said tongue;
(h) means connected to actuate said first hydraulic cylinder to invert said substantially U-shaped axle and move said frame member to a raised position;
(i) a second hydraulic cylinder pivotally connected to the base portion of said frame member, the piston of said second hydraulic cylinder being connected to said container; and
(j) means connected to actuate said second hydraulic cylinder to rotate said container around its pivoted edge to a dumping position.

5. Apparatus of the class described comprising:
(a) a frame member;
(b) first and second wheel means mounted in spaced apart relationship by means of a substantially U-shaped axle;
(c) means securing said frame member to the base portion of said U-shaped axle;
(d) a tongue member having an outer member and a telescoping inner member, one end of said outer member being pivotally secured to said frame member, the axis of said tongue being substantially parallel to said wheels;
(e) a hydraulic cylinder connected to said frame member, the piston of said hydraulic cylinder being connected to said axle;
(f) first and second tie rods, said first tie rod connecting said axle to said outer member of the tongue and said second tie rod connecting said axle to the telescoping inner member of said tongue; and
(g) means connected to actuate said hydraulic cylinder to invert said substantially U-shaped axle and move said frame member to a raised position.

6. Apparatus of the class described comprising:
(a) first and second wheel means mounted in spaced apart relationship by means of a substantially U-shaped axle;
(b) a frame member having an upwardly extending side portion;
(c) means securing said frame member to the base portion of said U-shaped axle;
(d) a tongue member having an outer member and a telescoping inner member, one end of said tongue member being rigidly secured to said frame member, the axis of said tongue being substantially parallel to said wheels;
(e) a container riding on said frame and having one edge pivotally mounted to the extended edge of the side portion of said frame;
(f) a first hydraulic cylinder connected to said frame member, the piston of said first hydraulic cylinder being connected to said axle;
(g) first and second tie rods, said first tie rod connecting said axle to the outer member of said tongue and said second tie rod connecting said axle to the telescoping inner member of said tongue;
(h) means connected to actuate said first hydraulic cylinder to invert said substantially U-shaped axle and move said frame member to a raised position;
(i) a second hydraulic cylinder connected to said frame member, the piston of said second hydraulic cylinder being connected to said container; and
(j) means connected to actuate said second hydraulic cylinder to rotate said container around its pivoted edge to a dumping position.

7. Apparatus of the class described comprising:
(a) first and second wheel means mounted in spaced apart relationship by means of a substantially U-shaped axle;
(b) a generally L-shaped frame member secured to the base portion of said U-shaped axle;
(c) a container riding on the base of said L-shaped frame and having one edge pivotally connected to the upper end of the leg of said L-shaped frame member;
(d) means connected to invert said U-shaped axle and move said frame to a raised position; and
(e) means connected to said container to rotate said container around its pivotal edge to a dumping position.

References Cited by the Examiner

UNITED STATES PATENTS

| | | | |
|---|---|---|---|
| 2,799,416 | 7/1957 | Balko | 280—414 X |
| 3,080,196 | 3/1963 | Darby | 280—42.23 X |
| 3,083,058 | 3/1963 | Walstrom | 298—11 |

FOREIGN PATENTS

| | | |
|---|---|---|
| 229,651 | 6/1960 | Australia. |
| 1,190,992 | 5/1959 | France. |

BENJAMIN HERSH, *Primary Examiner.*

ARTHUR L. LA POINT, *Examiner.*